United States Patent

[11] 3,560,637

[72] Inventors Saneyuki Takeuchi;
Hideo Watanabe, Tokyo, Japan
[21] Appl. No. 699,928
[22] Filed Jan. 23, 1968
[45] Patented Feb. 2, 1971
[73] Assignee Fuji Telecasting Company, Ltd.
Tokyo, Japan
a corporation of Japan
[32] Priority Feb. 9, 1967
[33] Japan
[31] 42/7916

[54] METHOD AND APPARATUS FOR SEPARATING MULTI-COLOR VIDEO SIGNALS INTO PRIMARY COLOR SIGNAL COMPONENTS BY POLARITY SEPARATION TECHNIQUES
15 Claims, 14 Drawing Figs.

[52] U.S. Cl. ........ 178/5.4
[51] Int. Cl. ........ H04n 9/06
[50] Field of Search ........ 178/5.4STC

[56] References Cited
UNITED STATES PATENTS

| | | | |
|---|---|---|---|
| 2,705,258 | 3/1955 | Lesti | 178/5.4 |
| 2,738,379 | 3/1956 | James et al. | 178/5.4 |
| 2,843,659 | 7/1958 | James | 178/5.4 |
| 2,892,883 | 6/1959 | Jesty et al. | 178/5.4 |
| 3,001,012 | 9/1961 | Braicks | 178/5.4 |
| 3,015,689 | 1/1962 | Hirsch | 178/5.4 |
| 3,407,265 | 10/1968 | Krause | 178/5.4 |

*Primary Examiner*—Robert L. Griffin
*Assistant Examiner*—John C. Martin
*Attorney*—Fidelman, Wolffe & Leitner

ABSTRACT: Method and apparatus for separating a multicolor video signal into primary signal color components utilizing a finely divided, striped optical filter forming a video signal image on a signal image pickup tube provided with constant width primary color filaments. The output from the image pickup tube is divided into three signals. The second signal is delayed twice the time interval corresponding to the width of a primary color filament. The third signal is delayed by a time interval corresponding to the width of a primary color filament. The first and the delayed second signal is combined in a differential output device to provide a first intermediate signal, a portion of which is rectified in a full-wave rectification device to result in a second intermediate signal. The second intermediate signal and the delayed third signal are combined in a differential output device to provide a third intermediate signal. A portion of the third intermediate signal is rectified to produce a first primary color signal component comprising the negative portion of the third intermediate signal. A portion of the first primary color signal component is combined with the second intermediate signal in a differential output device to produce a second primary color signal component. Another portion of the third intermediate signal is rectified in a half-wave rectifying device to produce a positive portion of said third intermediate signal. The first intermediate signal is rectified in a half-wave rectification device to produce a positive portion of the said first intermediate signal. The first intermediate signal is rectified in a half-wave rectification device to produce a positive portion of said first intermediate signal. The positive portion of the first intermediate signal is delayed by an interval corresponding to the width of a primary color filament to result in a fourth intermediate signal. The fourth intermediate signal is combined in a differential output device with the positive portion of said third intermediate signal to produce a third primary signal component. Accordingly, the full-wave and half-wave rectification techniques applied to the intermediate signals, and the subsequent combination in differential output devices of the delayed signals comprise polarity separation techniques for separating a multicolor video signal into primary color signal components.

METHOD AND APPARATUS FOR SEPARATING MULTI-COLOR VIDEO SIGNALS INTO PRIMARY COLOR SIGNAL COMPONENTS BY POLARITY SEPARATION TECHNIQUES

The present invention relates to a method of separating multicolor signal of color television by polarity separation system, and more particularly to a polarity separation system in colored image pickup types and the like using a single television image pickup tube in accordance with the phase separation system. The single image pickup tube system is exceedingly superior to other systems in respects of color tracking and registration. Further, since color image pickup machines can be manufactured in small sizes, light weights and at low costs by using this system, it has been developed in various types and put to practical use in various ways.

However, in the single image pickup tube system of the frequency separation type it is extremely difficult to fully compensate two beat signals of light modulation frequency, and in a case where there is a striped pattern (which often appears in clothing and the like) on the object to be picked up, the space frequency which said pattern has and two beats of modulation frequency remarkably impair the picture quality of color as false signals. This point has become problematic in the case where the color of high quality is required.

The conventional single image pickup tube of phase separation type has employed a time division gate system as a method of color separation. In this system, an index signal for discrimination is inserted upon modulation of light, or a gate pulse is produced by separating a carrier from modulated signal to carry out a color separation. However, to correctly maintain the phase of the gate pulse a complicated and stable circuit is required and hence the protection and operation thereof are considerably troublesome. Further, as a method of color separation utilization of rectangularity of the carrier may be considered but it has been considered difficult to separate three-color components from each other (Television Society Magazine Vol. 18, No. 9, Page 26(554), Toshihiko Takagi).

It is, therefore, an object of the present invention to provide a novel method of overcoming the above described drawbacks in the single image pickup system of phase separation type.

Further objects and advantages will be apparent from the following description taken in connection with the accompanying drawings, in which.

Figure 1:
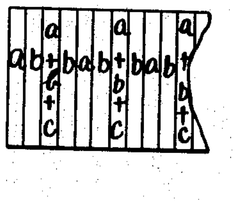
FIG. 1 is a view showing a preferred embodiment of an optical filter employed in accordance with this invention.

The principle of the present invention will be explained by referring to an example hereinbelow. FIG. 1 shows a preferred embodiment of an optical filter employed in accordance with the present invention.

Figure 2:
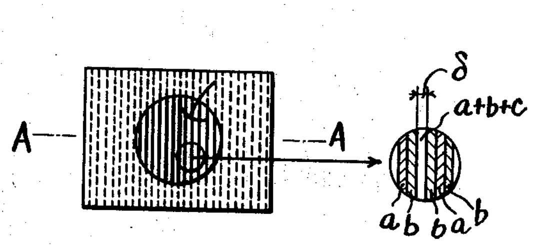
FIG. 2 is a view showing an image of an object, which is picked up and formed on the photoelectric conversion surface of an image pickup tube by said filter, and a partially enlarged view of the same.

In the drawings, reference characters $a$, $b$, and $c$ denote three primary colors respectively. The portion $a$ of this filter represents, on principle, a spectrum permeation characteristic corresponding to the color mixture curve of $a$, the portion $b$ a spectrum permeation characteristic corresponding to the color mixture curve of $b$, and the portion $(a+b+c)$ having a spectrum permeation characteristic to the entire visible light spectrum. Thus the filter, in principle, comprises a flat, striped optical filter. When such a filter is employed, a striped image of the object as shown in FIG. 2 can be formed on the photoelectric surface or photoconductive surface of the image pickup tube. More particularly, the image on the photoelectric surface or photoconductive surface is finely divided and arranged so that light pattern (shown in the enlarged pattern in FIG. 2) of $a$ primary color—light pattern of $b$ primary color—light pattern of entire color $(a+b+c)$ and—light pattern of $b$ primary color, will correspond exactly to the respective object colors when finely divided into $a$ primary color, $b$ primary color and $c$ primary color.

Further, width $\delta$ of each color light pattern is minimized but it is larger than the reproducible width limit of the image pickup tube. Of these color light patterns, the color light pattern represented by $(a+b+c)$ includes $a$ primary color component, $b$ primary color component and $c$ primary color component, and hence it can be looked upon as a portion imparting a sum of three color components consisting of $a$ primary color component, $b$ primary color component and $c$ primary color component.

Figure 3:
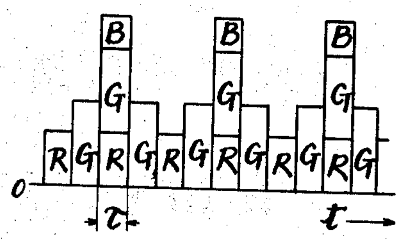
FIG. 3 is a view showing a preferred embodiment of a video signal obtained by scanning the image formed on the photoelectric conversion surface and also showing a preferred embodiment of the arrangement of signals of primary color components at every time interval $\tau$ corresponding to the width $\delta$ of primary color filament strip in FIG. 2.

Consequently, in a case where this image is picked up as a video signal, for example, a part of the video signal $S_1(t)$ corresponding to the line A–A′ of FIG. 2 assumes a form as shown in FIG. 3. In FIG. 3, three primary colors of light, i.e., R(red) primary color, G(green) primary color and B(blue) primary color generally used, are applied respectively to $a$ primary color, $b$ primary color and $c$ primary color. Also, the width $\delta$ of each light pattern is predetermined and the time spacing corresponding to $\delta$ is denoted as $\tau$.

More particularly, in the video signal $S_1(t)$ in FIG. 3 R denotes an information corresponding to R primary color component of the object, G, an information corresponding to G primary color component, and B, an information corresponding to B primary color component. In such a signal $S_1(t)$ it is possible to easily separate information of each primary color component directly or indirectly depending on the polarity.

The present invention is mainly characterized by this principle. An example of the present invention will be shown hereinbelow. Firstly, a difference signal $F_1(t)$ between the signal $S_1(t)$ and a signal $S_1(t-2\tau)$ by $2\tau$ ahead of this signal $S_1(t)$ is produced. Namely, it is represented by the following equation, $$F_1(t)=S_1(t)-S_1(t-2\tau) \quad (1)$$

Figure 4:
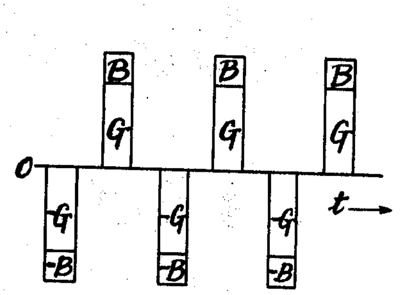
FIG. 4 shows a view showing a waveform of signal obtained by delaying the signal shown in FIG. 3 by $2\tau$ and the thus delayed signal is deducted from the signal shown in FIG. 3.

Then, the signal $F_1(t)$ would assume a waveform as shown in FIG. 4.

Figure 5:
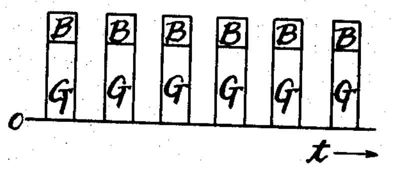
FIG. 5 is a view of a signal waveform obtained by subjecting the signal shown in FIG. 3 to a full-wave rectification.

Then, the signal $F_1(t)$ is subjected to a full-wave rectification to produce a signal $|F_1(t)|$. This waveform is shown in FIG. 5. When the signal $|F_1(t)|$ is deducted from the signal $S_1(t\tau)$ which is by $\tau$ ahead of $S_1(t)$, $Q_1(t)$ which is represented by the following equation is obtained.

$$Q_1(t)=S_1(t-\tau)-|F_1(t)| = S_1(t-\tau)-|S_1(t)-S_1(t-2\tau)| \quad (2)$$

Figure 6:
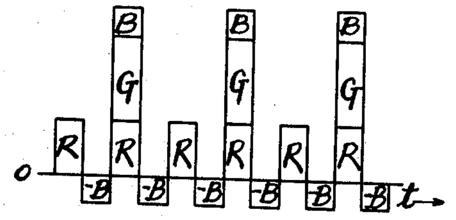
FIG. 6 is a view showing a waveform of signal obtained by deducting the signal shown in FIG. 5 from the signal obtained by delaying the signal shown in FIG. 3 by $\tau$ and further showing that only B component is minus.

It would be evident that it assumes a waveform as shown in FIG. 6. What is to be noted on this occasion is that the minus portion, $Q_1(t)^{(-)}$ of the signal $Q_1(t)$ is only B component of three primary colors as shown in FIG. 6.

Figure 7:
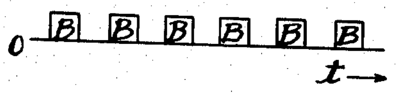
FIG. 7 is a view showing a waveform of signal shown in FIG. 6 from which the minus portion is deducted and further showing that B component is separated.

In conclusion, when the signal $Q_1(t)$ is clamped at O level and the minus portion is clipped by means of a diode, $-Q_1(t)^{(-)}$ is obtained as shown in FIG. 7, and thus it is possible to separate only B component.

Figure 8:
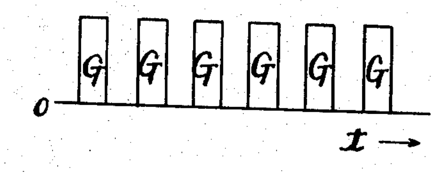
FIG. 8 is a view showing a waveform of signal obtained by deducting the signal shown in FIG. 7 from the signal shown in FIG. 5, and further showing that G component is separated.

Further, it would be obvious with reference to FIGS. 5 and 7 that by deducting $-Q_1(t)^{(-)}$ from $|F_1(t)|$ the signal $|F_1(t)+Q_1(t)^{(-)}$ is the component merely consisting of G primary color. Namely, this signal is shown in FIG. 8. This signal can be shown by the following formula, $$|S_1(t)-S_1(t-2\tau)|+\{S_1(t-\tau)-|S_1(t)-S_1(t-2\tau)|\}^{(-)} \quad (3)$$

However, sign (−) on the right shoulder of each term of the formula is designated to pick up only the minus part of the signal of the term of the formula. Also, the separation of R component can be achieved in the following manner.

Figure 9:
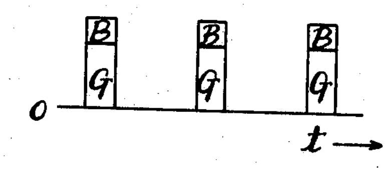
FIG. 9 is a view showing a waveform of signal shown in FIG. 4 from which the plus portion is selected.
Figure 10:
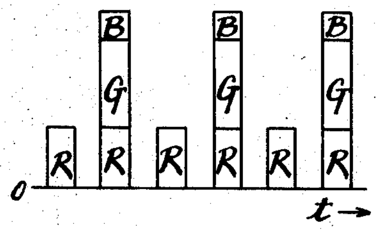
FIG. 10 is a view showing a waveform of signal obtained by picking up only the plus portion from the signal waveform shown in FIG. 6.

Firstly, the plus portion $F_1(t)^{(+)}$ of the signal $F_1(t)$ is separated by subjecting $F_1(t)$ to a half-wave rectification. This waveform is shown in FIG. 9. When only the plus portion of the signal $Q_1(t)$ shown in FIG. 6 is separated by means of a half-wave rectifier, the thus separated signal is denoted as $Q_1(t)^{(+)}$, it would assume a waveform as shown in FIG. 10.

Figure 11:
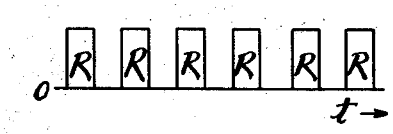
FIG. 11 is a view showing a signal obtained by delaying the signal shown in FIG. 9 by $\tau$ and deducting the thus delayed signal from the signal shown in FIG. 10, and also showing that R component is separated.

When $F_1(t-\tau)^{(+)}$ is deducted from $Q_1(t)^{(+)}$, it is evident that only R component can be separated as shown in FIG. 11. The signal on this occasion can be shown in the following equation, $$Q_1(t)^{(+)}-F_1(t-\tau)^{(+)}=\{S_1(t-\tau)-|S_1(t)-S_1(t-2\tau)|\}^{(+)}-\{S_1(t-\tau)-S_1(t-3\tau)\}^{(+)} \quad (4)$$

It is, of course, possible to utilize $S_1(t)$ itself in place of a brilliance signal by limiting the band-pass thereof. In the foregoing, the relationship between informations of the same primary color in the vicinity is presumed to be very close and therefore the difference therebetween is disregarded. A difference, however, actually is present and rather favorable effects are sometimes produced in this system. This point, however, is not the essence of the present invention so that it will not be referred any more.

Figure 12:
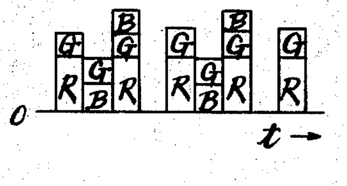
FIG. 12 is a view showing a video signal due to another primary color component arrangement, whose polarity is separable.

Another phase pattern is shown in FIG. 12. When this signal is denoted as $S_2(t)$, R, G and B primary color components can be separated respectively. However, signs (+) and (−) put on the shoulders of terms of the formulas and reference character $\tau$ have meanings identical with those described in the foregoing. For example, the separation of G component can be carried out by the following formula, $$\{|S_2(t)-S_2(t-2\tau)|-|S_2(t-\tau)-S_2(t-3\tau)|\}^{(+)} \quad (5)$$

The separation of B component can be carried out, for example, by the following formula, $$|S_2(t)-S_2(t-2\tau)|-\{|S_2(t)-S_2(t-2\tau)|-|S_2(t-\tau)-S_2(t-3\tau)|\}^{(+)} \quad (6)$$

The separation of R component can be carried out, for example, by the following formula, $$[S_2(t)-\{S_2(t)-S_2(t-2\tau)\}^{(+)}]+\{|S_2(t)-S_2(t-2\tau)|-|S_2(t-\tau)-S_2(t-3\tau)|\}^{(-)} \quad (7)$$

Figure 13:
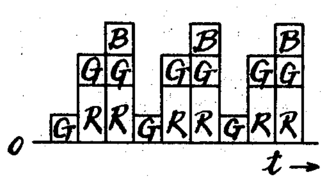
FIG. 13 shows an example of a video signal in accordance with further another primary color component arrangement, whose polarity is separable.

In the example of another signal pattern $S_3(t)$ as shown in FIG. 13 the following separations are possible. That is, R component can be separated, for example, in the following manner.

$$|\{S_3(t-\tau)-S_3(t-2\tau)\}^{(+)}+\{S_3(t)-S_3(t-\tau)\}^{(-)}| \quad (8)$$

B component can be separated, for example, in the following manner, $$|\{S_3(t)-S_3(t-\tau)\}^{(+)}+\{S_3(t-\tau)-S_3(t-2\tau)\}^{(-)} \quad (9)$$

G component can be separated, for example, in the following manner, $$S_3(t-\tau)-[\{S_3(t-\tau)-S_3(t-2\tau)\}^{(+)}+\{S_3(t)-S_3(t-\tau)^{(-)}\}]^{(+)}+\{S_3(t)-S_3(t-\tau)\}^{(-)} \quad (10)$$

The above described separations are not required to be limited to patterns optically obtained. They can also be utilized for the separation of primary color components in those patterns obtained by gating three informations. In conclusion, this system is exceedingly effective for the system change in a case where the number of scanning lines in a color television is different from another system. As has been described in the foregoing, R, G and B components are not always corresponding to red, green and blue, but, for example, they may be Y, I and Q respectively and further other informations.

An example of a block diagram of devices for carrying out the separation of R, G and B components respectively on the above described principle will be explained by referring to the pattern shown in FIG. 3.

Figure 14:
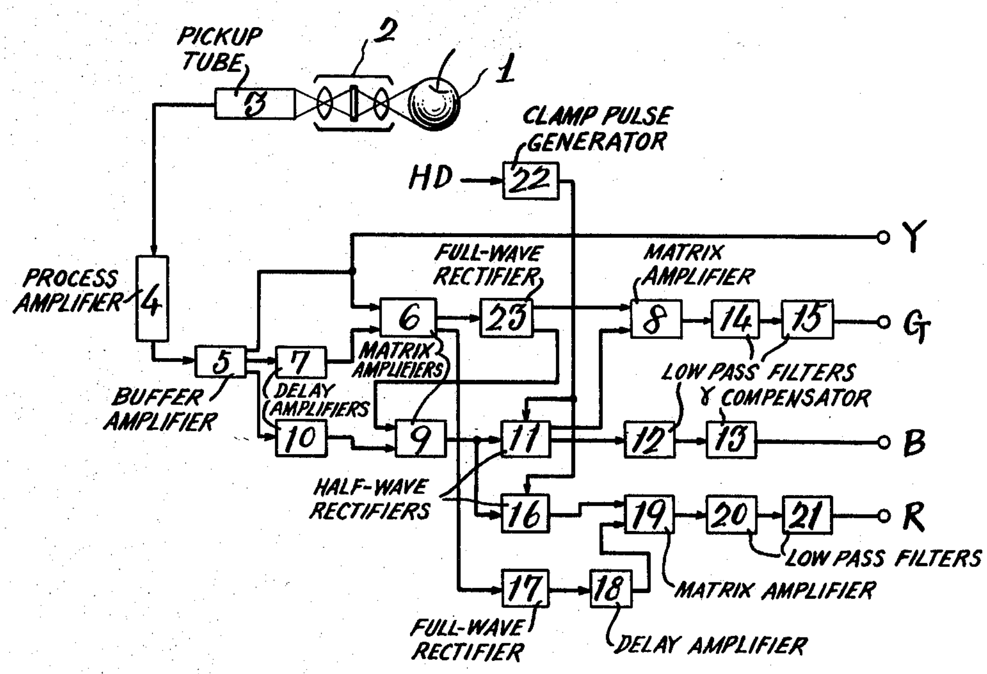
FIG. 14 is a block diagram showing devices of separating each primary color component from the video signal shown in FIG. 3.

In FIG. 14, reference numeral 1 designates an object to be picked up, 2 shows a lens system including a filter as shown in FIG. 1 and forms an image of the object 1 on the photoelectric conversion surface of an image pickup tube 3. On this occasion, the image on the photoelectric conversion surface is arranged to be constructed by filaments aligned in the order of *a* primary color, *b* primary color, $(a+b+c)$ primary color, *b* primary color.... In this case, let *a* primary color, *b* primary color and *c* primary color designate respectively R(red) primary color G(green) primary color and B(blue) primary color. The filament is not necessarily perpendicular to the scanning line of photoelectric conversion. It is needless to say that it is not necessarily a direct image of the object and may be an arrangement of informations obtained by way of a film and the like.

The image is converted to an electrical signal as shown in FIG. 3 by means of an image pickup tube 3. The electrical signal is not required to be obtained directly by an image pickup tube but the signals obtained by video tape recorder, flying spot scanner and the like are also available.

The signal is led to a process amplifier 4, time $\gamma$ is adjusted and an aperture compensation is carried out and a blanking is added, and thereafter is led to a buffer amplifier 5 for distribution use, in which $\gamma$ of the entire system of the signal is 1. The output of the buffer amplifier 5 is divided into three signals. The first output signal is directly introduced into a matrix amplifier 6. On the other hand, the second signal is delayed twice as long as the scanning time $\tau$, i.e. $2\tau$, corresponding to the filament width $\delta$ by means of a delay amplifier 7, and introduced into the matrix amplifier 6 in like manner as the case of the first signal. In the matrix amplifier 6 the difference between the first signal and the second signal is created to carry out operation of the formula (1) to obtain the waveform as shown in FIG. 4. The output from the amplifier 6 is subjected to a full-wave rectification by the rectifier 23 and assumes a waveform as shown in FIG. 5 and introduced into the matrix amplifier 8.

The output from the rectifier 23 is guided by the matrix amplifier 9. The third output of the distribution buffer amplifier 5 is delayed by $\tau$ by means of the delay amplifier 10 and it is introduced into matrix amplifier 9. The above described formula (2) is completed in the matrix amplifier 9 and the output waveform assumes a form as shown in FIG. 6.

The output of the matrix amplifier 9 is clamped at the zero pedestal portion, and the minus portion is selected by a half-wave rectifier 11. The waveform thereof assumes a form sampled as shown in FIG. 7 and hence is held by a low-pass filter 12 and $\gamma$ of image receiving tube is compensated by means of a $\gamma$-compensator 13 and picked up as a B primary color output.

Further, the output of the rectifier 11 is introduced into the matrix amplifier 8 together with the signal from full-wave rectifier 23 to result in a signal of formula (3). The waveform thereof assumes a shape as shown in FIG. 8, and is held by low-pass filters 14, and 15, and $\gamma$ of the image receiving tube is compensated by $\gamma$-compensator and picked up as an output of G primary color component.

The plus portion of the output at the matrix amplifier 9 is selected by the half-wave rectifier 16 and shaped in a waveform as shown in FIG. 10. The plus portion of the output at the matrix amplifier 6 is selected by the full-wave rectifier 17 and shaped in a waveform as shown in FIG. 10. The output from the rectifier 17 is further delayed by $\tau$ by means of the delay amplifier 18 and led to the matrix amplifier 19 together with the output of the rectifier 16. In the matrix amplifier 19 an operation of the formula (4) is accomplished from a combination of these signals from delay amplifier 18 and half-wave rectifier 16 and a waveform as shown in FIG. 11 is obtained. This waveform is held by low-pass filters 20, and 21, and $\gamma$ of the image receiving tube is compensated by $\gamma$-compensator and picked up as an output of R primary color component. Reference numeral 22 indicates a clamp pulse generator arranged for maintaining clip level of the rectifiers designated by reference numerals 11 and 16 at a predetermined value.

We claim:

1. A method of separating a multicolor video signal into primary color signal components, including the steps of:
- forming a multicolor, finely divided, striped video signal image on a single image pickup tube having primary color filaments of equal geometric widths;
- dividing the output signal from the image pickup tube into first, second and third signals;
- delaying the second signal by twice the time interval corresponding to the width of a primary color filament;
- combining said first signal and said delayed second signal thereby producing a first intermediate signal;
- rectifying said first intermediate signal to result in a second intermediate signal;
- delaying said third signal by a time interval corresponding to the width of a primary color filament;
- combining said delayed third signal with said second intermediate signal, thereby producing a third intermediate signal;
- rectifying said third intermediate signal to result in a first primary color signal component which comprises the negative portion of said third intermediate signal;
- combining a portion of said first primary color signal component with said second intermediate signal to result in a second primary color signal component;
- rectifying said third intermediate signal to produce a positive portion of said third intermediate signal;
- rectifying said first intermediate signal to produce a positive portion of said first intermediate signal;
- delaying said positive portion of said first intermediate signal by an interval corresponding to the width of a primary color filament, thereby resulting in a fourth intermediate signal; and
- combining said fourth intermediate signal with said positive portion of said third intermediate signal to result in a third primary color signal component.

2. The method as decided in claim 1, wherein, the step of producing a first intermediate signal includes the step of obtaining the difference between said first signal and said delayed second signal.

3. The structure as recited in claim 2, wherein, the step of rectifying said first intermediate signal includes rectifying said first intermediate signal in a full wave rectification device.

4. The structure as cited in claim 3, wherein, the step of producing a third intermediate signal includes the step of obtaining the difference between said delayed third signal and said second intermediate signal.

5. The structure as cited in claim 4, wherein, the step of rectifying said third intermediate signal includes rectifying said third intermediate signal in a half-wave rectification device.

6. The structure as cited in claim 5, wherein, the step of rectifying said first intermediate signal includes the step rectifying said first intermediate signal in a half-wave rectifying device.

7. Apparatus for separating a multicolor video signal into primary color signal components, including:
- a single video image pickup tube having primary color filaments of equal widths;
- an optical finely divided, striped optical filter for forming a striped light pattern on the image pickup tube, wherein the widths of the light pattern stripes are larger than the reproducible limits of the image pickup tube filaments;
- means connected to the pickup tube for dividing the pickup tube output signal into first, second and third signals;
- first delaying means connected to said dividing means for delaying the second signal by twice the time interval corresponding to the width of a primary color filament;
- first combining means connected to said dividing means and said first delaying means for combining said first signal and said delayed second signal to produce a first intermediate signal;
- first rectifying means connected to said first combining means for rectifying said first intermediate signal to result in a second intermediate signal;
- second delaying means connected to said dividing means for delaying said third signal by a time interval corresponding to the width of a primary color filament;
- second combining means connected to said second delaying means and said first rectifying means for combining said delayed third signal with said second intermediate signal to produce a third intermediate signal;
- second rectifying means connected to said second combining means for rectifying said third intermediate signal to result in a first primary color signal component comprising the negative portion of said third intermediate signal;
- third combining means connected to said rectifying means and said first rectifying means for combining a portion of said first primary color signal component with said second intermediate signal to result in a second primary color signal component;
- third rectifying means connected to said second combining means for rectifying said third intermediate signal to produce a positive portion of said third intermediate signal;
- fourth rectifying means connected to said first combining means for rectifying said first intermediate signal to produce a positive portion of said first intermediate signal;
- third delaying means connected to said fourth rectifying means for delaying said positive portion of said first intermediate signal by a time interval corresponding to the width of a primary color filament to result in a fourth intermediate signal; and
- fourth combining means connected to said third delaying means and said third rectifying means for combining said fourth intermediate signal with said positive portion of said third intermediate signal to result in a third primary color signal component.

8. The structure as recited in claim 7, wherein said first combining means includes a differential signal output device obtaining the difference between said first signal and said delayed second signal.

9. The structure as recited in claim 8, wherein said first rectifying means comprises a full-wave rectifier for full-wave rectification of said first intermediate signal.

10. The structure as recited in claim 9 wherein, said second combining means comprises a differential output device obtaining the difference between said delayed third signal and second intermediate signal.

11. The structure as recited in claim 10 wherein, said second rectifying means includes a half-wave rectifier.

12. The structure as recited in claim 11, wherein, said third combining means comprises a differential output device obtaining the difference between a portion of said first primary color signal component and said second intermediate signal.

13. The structure as recited in claim 12, wherein, said third rectifying means comprises a half-wave rectifier.

14. The structure as recited in claim 13, wherein, said fourth combining means includes a differential output device obtaining the difference between said fourth intermediate signal and said positive portion of said third intermediate signal.

15. The structure as recited in claim 14, wherein, said fourth rectifying means includes a half-wave rectifier.